Aug. 9, 1960

R. WITTE 2,948,109

MECHANISM FOR AUTOMATICALLY ADJUSTING CLOCK REGULATORS

Filed June 13, 1957

INVENTOR
Roy Witte
BY
Pennie, Edmonds, Morton,
Barrows and Taylor
HIS ATTORNEYS

INVENTOR
Roy Witte
BY Pennie, Edmonds, Morton,
Barrows and Taylor
HIS ATTORNEYS

Aug. 9, 1960 R. WITTE 2,948,109
MECHANISM FOR AUTOMATICALLY ADJUSTING CLOCK REGULATORS
Filed June 13, 1957 7 Sheets-Sheet 3

INVENTOR
Roy Witte
BY Pennie, Edmonds, Morton, Barrows & Taylor
HIS ATTORNEYS Aug. 9, 1960            R. WITTE            2,948,109

MECHANISM FOR AUTOMATICALLY ADJUSTING CLOCK REGULATORS

Filed June 13, 1957            7 Sheets-Sheet 4

FIG. 7

INVENTOR
Roy Witte
BY
Pennie, Edmonds, Morton, Barrows & Taylor
HIS ATTORNEYS

Aug. 9, 1960 R. WITTE 2,948,109
MECHANISM FOR AUTOMATICALLY ADJUSTING CLOCK REGULATORS
Filed June 13, 1957 7 Sheets-Sheet 6

INVENTOR
Roy Witte
BY
Pennie, Edmonds, Morton, Barrows & Taylor
HIS ATTORNEYS

Aug. 9, 1960 R. WITTE 2,948,109
MECHANISM FOR AUTOMATICALLY ADJUSTING CLOCK REGULATORS
Filed June 13, 1957 7 Sheets-Sheet 7

INVENTOR
Roy Witte
BY Pennie, Edmonds, Morton, Barrows and Taylor
HIS ATTORNEYS

United States Patent Office 2,948,109
Patented Aug. 9, 1960

2,948,109

MECHANISM FOR AUTOMATICALLY ADJUSTING CLOCK REGULATORS

Roy Witte, Wheaton, Ill., assignor to General Time Corporation, New York, N.Y., a corporation of Delaware Filed June 13, 1957, Ser. No. 665,569

16 Claims. (Cl. 58—109)

This invention relates to the automatic regulation of timepieces and particularly to improvements in automatic regulating mechanism adapted to be used in connection with spring-wound timepieces as distinguished from timepieces, such as automobile clocks, which are equipped with some form of power-operated means and, consequently, seldom run down.

With spring-driven clocks which are hand-wound it has been found that a large number of users allows their clocks to run down more or less regularly. However, the mere fact that the clock has run down does not mean that the regulator should be adjusted, inasmuch as the clock might have been keeping the correct time. Automatic regulator adjusting mechanism which changes the adjustment of the regulator whenever the hands are corrected, is not suitable for such clocks, and, consequently, the automatic regulator adjustment mechanism which today is in more or less common use in automobile clocks is not appropriate for them. It is true that in some automobile clock mechanisms, an arrangement is provided whereby by special manipulation the clock hands can be corrected without adjusting the regulator, but such special manipulation is also undesirable in connection with spring driven clocks. The user of a spring driven clock should be able to wind and set the clock in the customary way after it has stopped, without changing the regulator.

The object of the present invention is to provide automatic regulator adjusting mechanism which is especially suitable for embodiment in hand-wound clocks and which provides that the hands may be reset without making any change whatever in the adjustment of the regulator, in the event the clock has run down and requires a considerable movement of the hands in order to re-set them correctly.

Another object of the invention is to provide an automatic regulator adjusting mechanism which, where a clock requires a hands correction of a comparatively small amount, for example up to approximately ten minutes, a change in the regulator will be made automatically in proportion to the amount of the hands correction, but should the clock require a hands correction of substantially more than such a critical amount, for example, approximately twenty minutes, or more, either no change in the regulator will be made, or such change will be greatly reduced.

Another object of the invention is to provide an automatic regulator adjusting mechanism which will effect changes in the regulator only in the event that the hands need correcting by not more than a predetermined amount.

Another object of the invention is to provide an automatic regulator adjusting mechanism wherein, should a hands correction be started in the wrong direction but is then reversed and continued in the right direction, the correct adjustment of the regulator will be made if the hands correction is not greater than a predetermined amount.

A further object of the invention is to provide a mechanism of this kind which is of rugged construction and requires the addition of substantially few parts to a standard clock mechanism, and which, therefore, can be embodied in inexpensive clocks such, for example, as the typical household alarm clock.

Throughout the specification and claims of this application it will be understood that the term "clock" includes any form of timepiece and the term "hands" is used to include not only the time-indicating fingers of the conventional clock, but also any type or form of time display or time-indicating means or device which it may be desired to incorporate in the timepiece.

The invention will be understood from a consideration of the accompanying drawings and the following description of two embodiments of the improved automatic regulator mechanism illustrated therein.

In these drawings:

Figs. 8–15 illustrate a modified form of the invention;

Figures 1, 6:
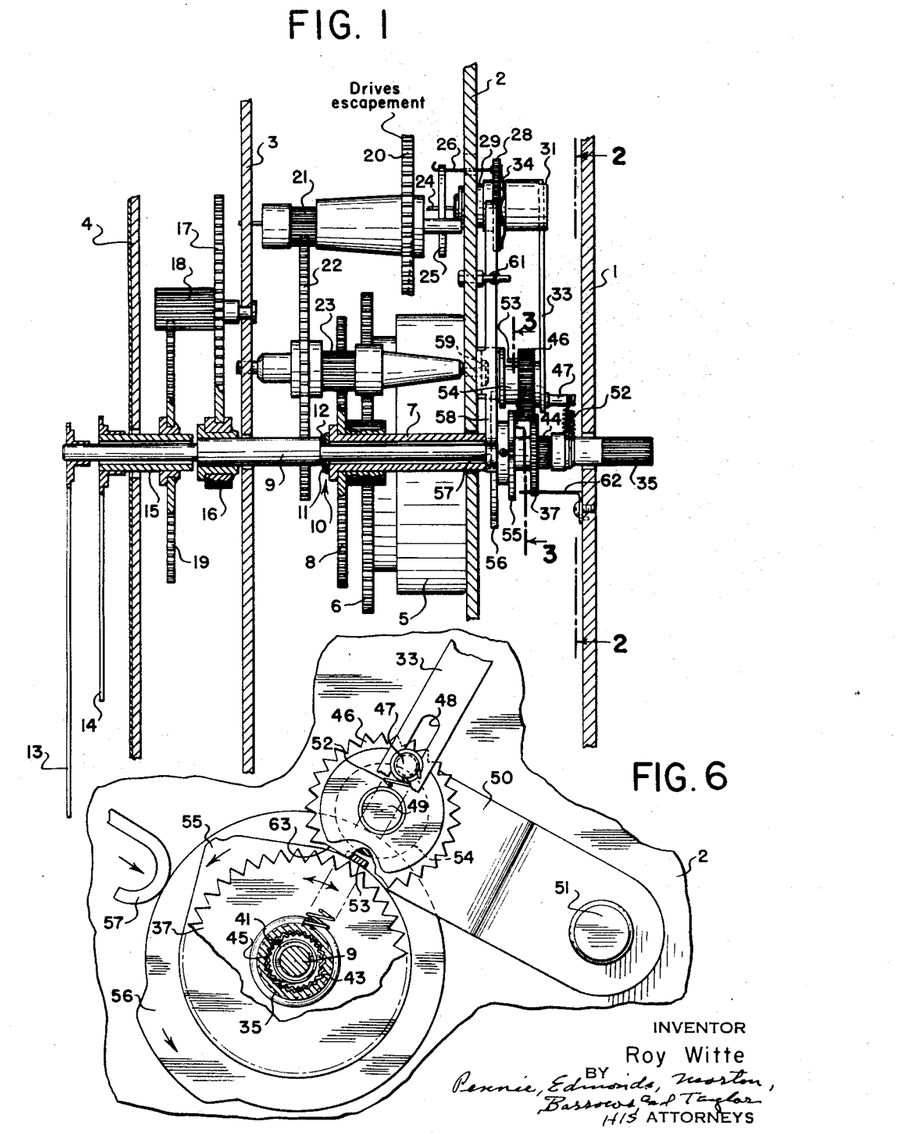
Fig. 1 is a view in central section of a spring-wound timepiece with my invention applied thereto.
Figs. 5, 6 and 7 are views similar to Fig. 2 showing parts in different positions.

Referring first to the form of the invention as shown in Figs. 1–7, a conventional or standard form of clock mechanism is illustrated in vertical section in Fig. 1, wherein the rear housing is indicated at 1, the rear frame member at 2 and the front frame member at 3, the clock dial and its support being shown at 4. The main spring is arranged within a spring housing 5. This spring is wound in a conventional manner by suitable means (not shown). A large gear 6, driven by the main spring, meshes with a pinion which is fixed to a sleeve shaft 7 on which a gear 8 is also fixed. Sleeve 7 rotates freely on the minute shaft 9. This shaft is driven by a slip drive connection 10 of the friction type having a spring washer 11 which frictionally engages the left end of sleeve 7 (Fig. 1) and a shoulder 12 formed on shaft 9.

The minute hand of the clock is shown at 13 and the hour hand at 14, the hub of the minute hand being pressed onto the end portion of minute shaft 9. The hub of hour hand 14 is similarly mounted on the end of the hour shaft which is in the form of a sleeve 15 that rotates freely on the front portion of minute shaft 9. The hour shaft, or sleeve 15, is driven from minute shaft 9 by means of a pinion 16, gear 17, pinion 18 and gear 19, the latter being fixed on hour sleeve 15.

The escapement mechanism for the clock is not shown, but is driven from gear 8 by means of a gear train. This train comprises a gear 20 which drives the escapement mechanism, a pinion 21, gear 22, pinion 23 and gear 8. The balance wheel shaft is shown at 24 and the hair spring at 25.

The rate regulator of the clock comprises a pin 26 which projects horizontally through an arcuate aperture 27 in rear frame 2 and engages the outer coil of the hair spring in the usual manner. Pin 26 is mounted in fixed position near the rim of a regulator adjusting wheel 28. This wheel and the automatic mechanism for adjusting it, which is the subject of the present invention, are mounted to the rear of rear frame plate 2.

Adjusting wheel 28 is mounted to turn on the outer surface of a shaft 29 which itself is mounted for turning movement in an aperture in frame plate 2, the center of this shaft being in alignment with balance wheel shaft 24. A spring washer 30 holds shaft 29 in position in the aperture in frame 2. The periphery of regulator wheel 28 is knurled for a purpose which will appear later.

The outer end of regulator shaft 29 has an enlarged head with a lateral recess or slot 31 across its outer face (Fig. 2) and held within this recess, by means of a screw 32, is a regulator adjusting lever 33. Pivotal movement of lever 33 about the center of shaft 29 rotates shaft 29 slightly and such turning movement is imparted to the regulator wheel 28 by means of a friction spring 34 which is inserted between a shoulder at the inner end of the head on the shaft, and the outer surface of knurled adjusting wheel 28.

Figures 4, 5:
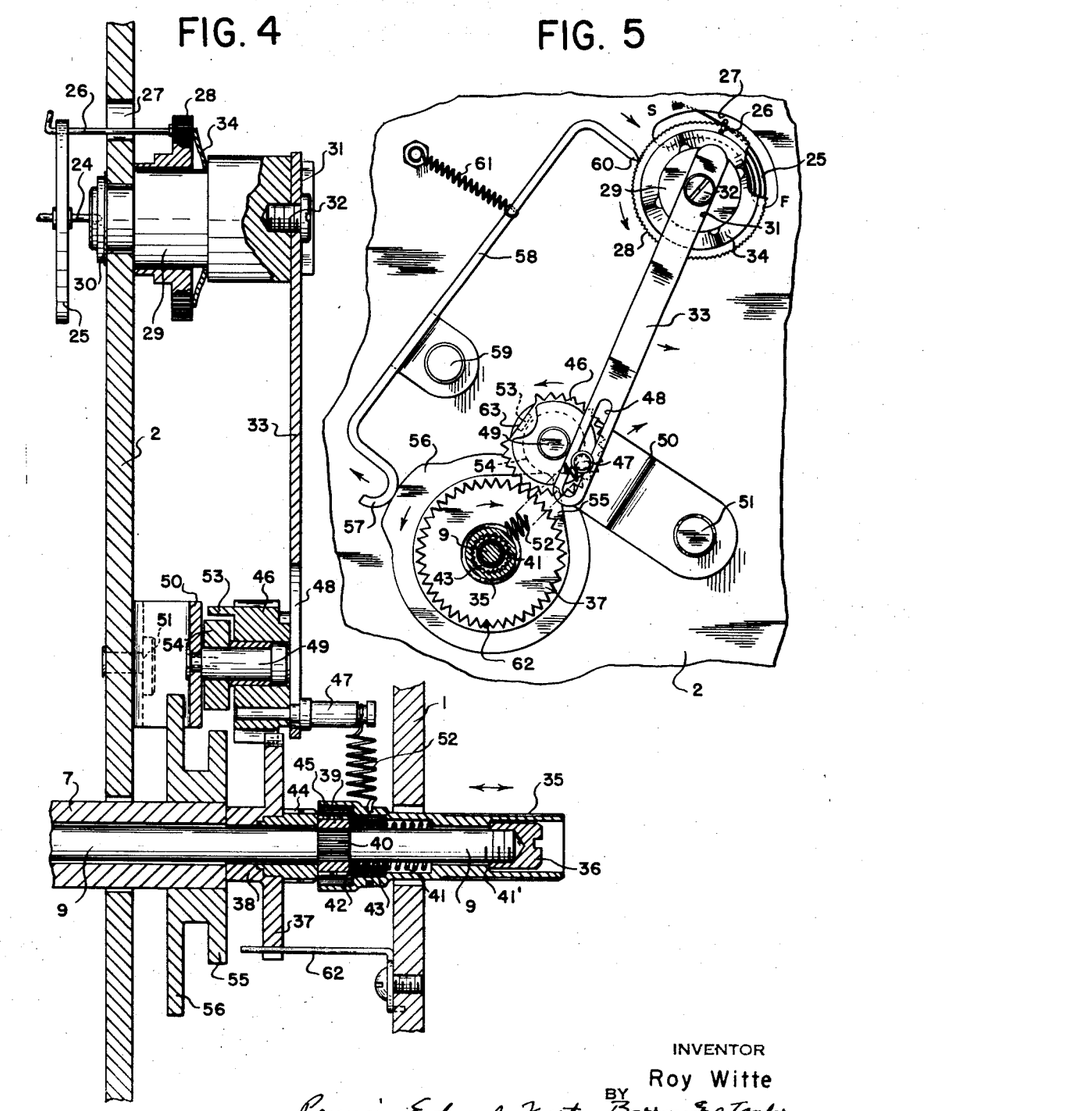
Fig. 4 is a sectional view taken on line 4—4 of Fig. 2 and drawn to the same scale as that figure.
Figure 7:
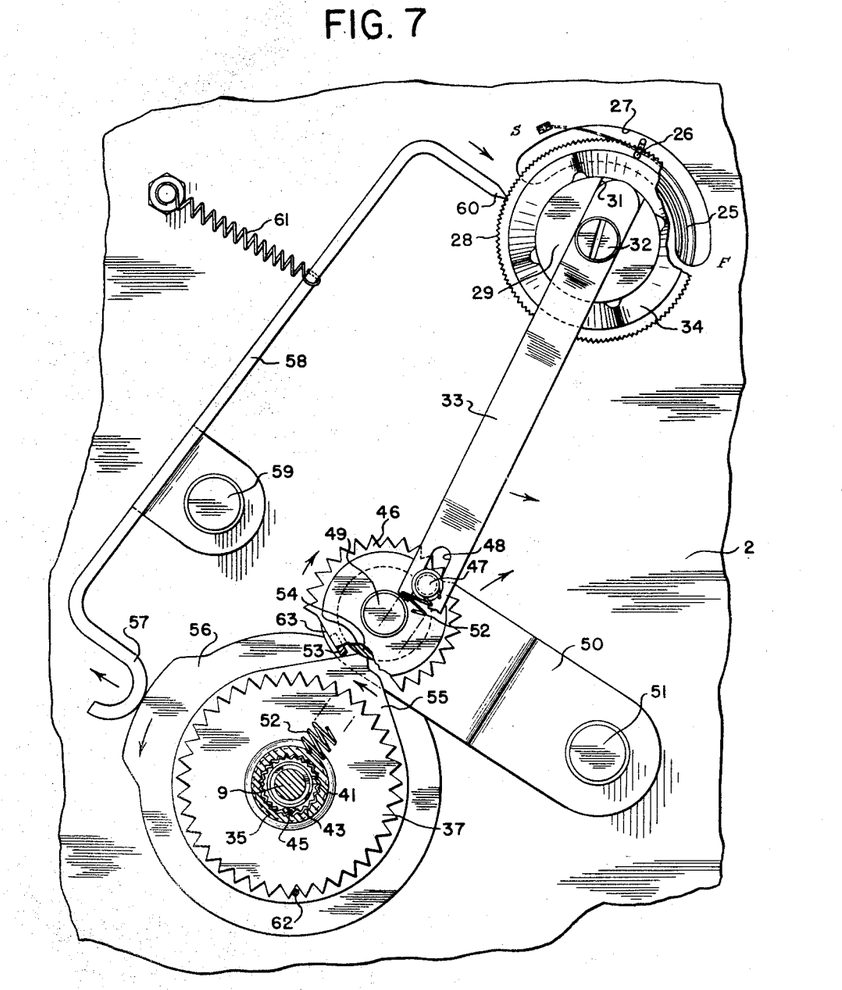

In accordance with the present invention the regulator adjusting lever 33 is rotated to a limited extent in either direction from a central position (shown in Fig. 2) in alignment with the center of pivot shaft 29 and the axis of a setting handle 35 which in the form illustrated is also the axis of the minute shaft 9 (Figs. 1 and 4). Lever 33 is rotated by the setting mechanism, as will presently be described, by an angular extent from this central position proportional to the amount of the necessary hands correction, provided the amount of such correction is not greater than a predetermined critical amount of, for example, ten minutes. This predetermined critical correction may be less or more than ten minutes as desired, but this figure is a convenient one. The positions of the center line of lever 33 when moved to give the critical or maximum correction, fast or slow, are shown by dot-and-dash lines F an S in Fig. 2.

The turning of lever 33 causes the turning of regulator shaft 29 and wheel 28, and thus produces a small change in the position of pin 26 with respect to hair spring 25. Such change in the regulator is made at the time the hands are corrected so that the clock movement immediately commences to operate at a slightly different running rate. Later the lever 33 is returned to its central position by mechanism which will also presently be described, and during such pivotal movement, the regulator wheel 28 is held or locked against rotative movement so that shaft 29 rotates slightly relatively to the regulator wheel 28 through the slip drive connection provided by the spring washer 34, and leaving regulator wheel 28 and pin 26 in the adjusted angular position.

The clock setting mechanism includes the knurled setting handle 35 which is mounted for turning movement on the rear end of minute shaft 9 and held thereon by a nut 36. It also includes a setting gear 37 having a hub 38 with portions projecting both to the rear and to the front of the gear, the hub turning freely on minute shaft 9. The front end of the hub bears against the rear end of sleeve shaft 7, and at the rear end there is a collar 39 which is splined as indicated at 40, or otherwise fixed, to minute shaft 9 and which serves to position the setting gear 37 on this shaft.

The knurled setting handle 35 is shiftable axially on shaft 9 to bring it into driving engagement with both setting gear 37 and minute shaft 9, in order to set the clock hands and operate the automatic regulator adjusting mechanism. The normal position of setting handle 35 is outward and it is held in this position by a compression coil spring 41 which holds a shoulder 41' at the bottom of a counter bore in the outer end of handle 35 against the inner end of nut 36.

The inner or front end of setting handle 35 is provided with a double spline arrangement for operating setting gear 37 and minute shaft 9 respectively. This includes internal splines 42 and 43 at the inner end portion of handle 35, and external splines 44 and 45 formed respectively on the outer portion of hub 38 of gear 37, and on collar 39 which is fixed to minute shaft 9.

Figures 2, 3:
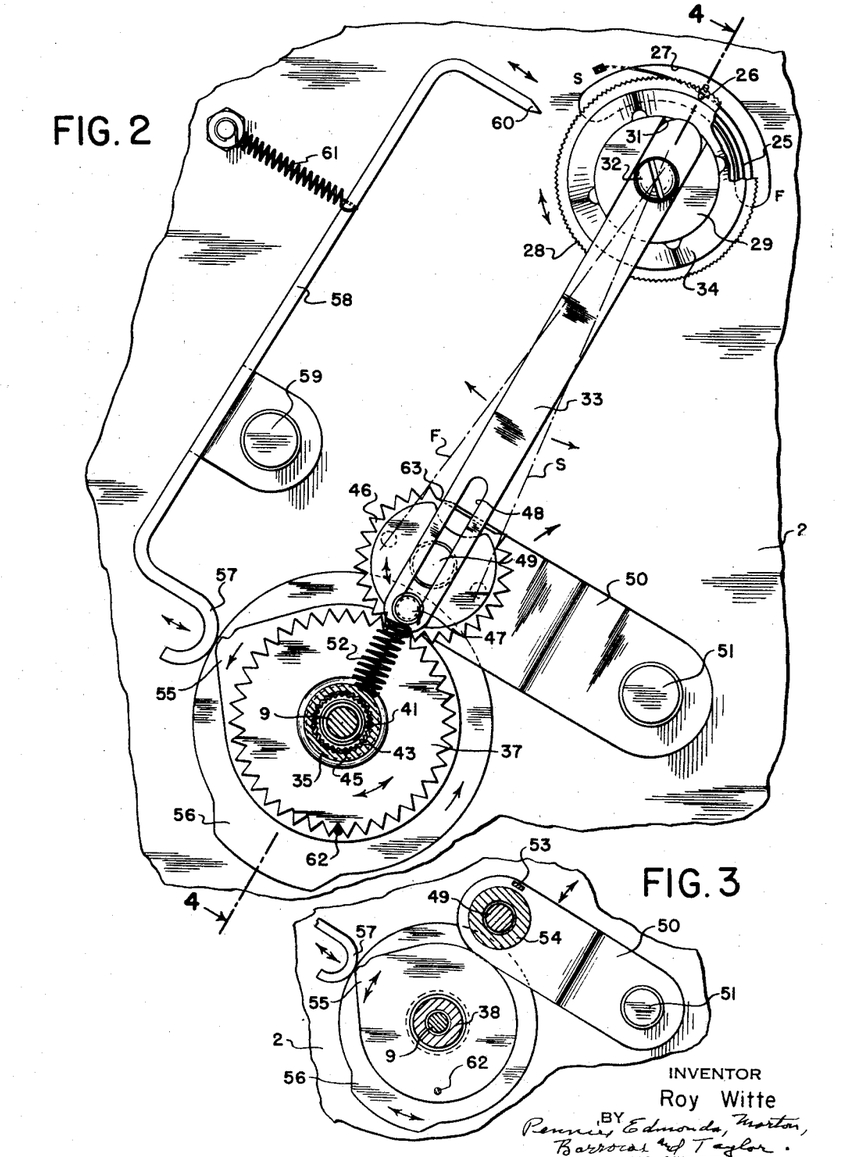
Fig. 2 is a view in rear elevation looking from the right of Fig. 1 with the rear housing plate removed, as indicated by line 2—2, and drawn to a larger scale.
Fig. 3 is a sectional view taken on broken line 3—3 of Fig. 1 and drawn to a somewhat larger scale.

The angular movement of regulator adjusting lever 33 and regulator shaft 29 to cause a change in the adjustment of the regulator is brought about by a displacement of lever 33 from its central position, shown in Fig. 2, towards one or the other of the F or S positions. To this end, a lever actuating gear 46 is arranged with its teeth constantly in mesh with setting gear 37, and, projecting from the surface of gear 46 there is a crank pin member 47. This pin is fixed in an aperture in gear 46 and projects from its surface and through an elongated slot 48 formed in the outer end portion of regulator adjusting lever 33.

Lever actuating gear 46 is mounted for rotation on a short stationary shaft 49 which projects from a bracket member 50 pivoted at 51 to the rear of clock frame member 2. The position of pivot 50 is such that gear 46 is supported with its center substantially on the line between the centers of regulator shaft 29 and wheel 28 and the axis of setting gear 37, and at the same time allows gear 46 to be shifted into and out of mesh with setting gear 37. A tension coil spring 52 having one end attached to crank pin 47, and the other to setting handle 35, biases the lever 33 into central position, that is, into alignment with the center line, above-mentioned.

Projecting inwardly from the inner surface of lever-actuating gear 46 there is a lug 53 which extends adjacent to, but out of contact with the surface of a roller 54 that turns freely on the inner portion of shaft 49 which supports lever actuating gear 46. The functions of these two parts will appear presently.

Fixed on the outer end portion of sleeve shaft 7 and at the rear of frame member 2, there is a double cam member. This member includes a releasing or disengaging cam 55 and a holding or locking cam 56 for holding the regulator against rotation. Inasmuch as it is sleeve shaft 7 which drives minute shaft 9 through the slip drive connection 10, these two shafts have the same rotative speed, namely, one revolution per hour. Sleeve shaft 7 is driven from the clock spring within housing 5 through the gear train previously described and cannot be set or turned manually like the minute shaft 9. From this it will be understood that cams 55 and 56 make one rotation every hour.

The purpose of cam 55 is to disengage the teeth of lever actuating gear 46 from those of the setting gear 37 for a purpose which will presently appear and, for this reason, the lobe of cam 55 is arranged to engage roller 54 and move bracket 50 outwardly. The purpose of cam 56 is to temporarily hold or lock the regulator adjustment wheel 28 to prevent its rotation under conditions which also will presently appear. With this in view the lobe of cam 56 engages one end 57 of a lever 58 which is pivoted at 59 to frame member 2, the opposite end 60 being pointed and moved against the knurled edge of wheel 28, as shown, for example, in Figure 5. A tension coil spring 61 swings lever 58 in the opposite direction and biases the end 57 against the cam.

The operation of this mechanism will now be discussed. Let it be assumed that the clock is running fast and has gained ten minutes. This is the critical correction, that is to say, it is the correction which will produce the maximum change in the regulator adjustment, and either a smaller or a greater change in the setting of the hands up to about twice the critical, i.e. twenty minutes, will bring about a smaller change in the regulator adjustment. A hands correction of this final amount of twenty minutes, or of any greater amount, will produce no change in the regulator.

To correct the setting of the hands, setting handle 35 is pushed inwardly and turned until the hands have been set backward ten minutes. This also brings about a rotation of setting gear 37 in the direction of the arrow (Fig. 2) and regulator adjusting or lever-actuating gear 46, the latter gear turning until the crank pin 47 has rotated 90° to the position shown in Figure 5, which corresponds with the S line of Figure 2. This tensions the coil spring 52 and the parts are held in this position against the force of spring 52, by means of a resilient detent member or wire 62 (Fig. 4) which is supported on the interior of clock-housing 1 and projects forwardly and engages the teeth of setting gear 37 on the lower side of this gear.

The swinging or displacing of lever 33 from its central position to the position shown in Figure 5, causes a slight rotation of regulator shaft 29 and regulator adjusting wheel 28 through the spring drive connection 34. Thus, the position of regulator pin 26 with respect to the hair spring is shifted, and the clock commences to operate at a slower rate. The parts remain in the position of Figure 5 until the sleeve shaft 7, which rotates once an hour, turns cam 55 until its lobe engages roller 54 and pushes bracket 50 outwardly sufficiently for the teeth of lever actuating gear 46 to be released from the teeth of setting gear 37. In Fig. 5 this is about to take place. When the release is effected, spring 52 will turn crank pin 47 back to the central or initial position of Fig. 2.

The lobe of cam 56 is advanced about 90° ahead of the lobe 55, and thus when disengagement of the gear teeth takes place, lever 58 has been shifted until its pointed end 60 has moved against the knurled periphery of regulator wheel 28 (Fig. 5). The width of the lobe of cam 56 is sufficient to maintain this locked position until the lobe of cam 55 has completely passed the roller 54 and moved out of engagement with it. While the lever 33 is returning to its central position, at the instant of release of the teeth of gears 46 and 37, the regulator wheel 28 is held in the position to which it has been manually adjusted, as above-described, and the regulator shaft 29 rotates angularly somewhat with respect to the regulator wheel 28, being permitted to do this by the spring drive connection 34.

It will be understood that should the hands be reset at the time cam 55 happens to hold gears 46 and 37 out of engagement with one another, no change in the regulator adjustment will be effected, but since the cam arrangement is such that the gears are out of engagement for only four or five minutes, and since this occurs only once an hour, the chance of the clock being reset at this particular time is not very great.

In the event that, at the time of setting the clock, it had gained less than ten minutes, the correcting of the hands by turning handle 35 would move the crank pin 47 and 33 to some position intermediate the central position and the position shown in Fig. 5. The resulting change in the regulator adjustment would be approximately proportional to the amount of the hands correction.

Should the clock have gained more than the critical amount, say, for example, twenty minutes, the turning of the hands in the backward direction by this extent would cause the lever actuating gear 46 to be rotated past the 90° crank pin position of Fig. 5 to the 180° crank pin position, shown in Fig. 6. This would first cause regulator wheel 28 to be rotated as previously described and then rotated in the opposite direction by an equal angular amount so that the regulator wheel would be returned to its original position, and no change in the regulator adjustment would result.

In order to stop gear 46 in this position so as to permit the resetting of the hands to any desired extent, as would be necessary if the clock had ceased running and been stopped for some hours, a blank section 63 where there are no gear teeth is provided on lever actuating gear 46, and this section is arranged diametrically opposite crank pin 47. When, therefore, gear 46 has been turned 180° to the position of Fig. 6, further rotation is prevented. Consequently, the hands of the clock may be turned as much as desired by the setting handle 35 without producing any effect on the regulator adjusting mechanism.

Inasmuch as the crank pin 47 is now on a dead center position, it is necessary to rotate the gear slightly in order that spring 52 may turn it back to its initial position, the position of Fig. 2. The lug 53, previously referred to, is placed on gear 46 for this purpose and is positioned diametrically opposite crank pin 47 and in line with the center of the blank tooth space 63. Consequently, when the lobe of cam 55 rotates to the vicinity of gear 46 (see Fig. 7), it first contacts roller 54 and causes the outward disengaging movement of bracket 50 so as to free the teeth of gear 46 from those of gear 37. Immediately after this the gear lobe engages the lug 53 and thereby turns gear 46 sufficiently to swing crank pin 47 away from the dead center position, whereupon spring 52 promptly returns the gear to the initial position of Fig. 2.

Should the clock be running either fast or slow by an amount between the critical ten minutes and the maximum or final amount of twenty minutes, the resetting of the hands by turning handle 35 will move gear 46 and crank pin 47 to some position intermediate between that of Fig. 5 and that of Fig. 6. This will first put the maximum amount of adjustment into the regulator and then reduce it somewhat from the maximum, depending upon the extent to which lever 33 has been moved angularly backward towards its central position. This will cause a change in the regulator adjustment which is less than the amount required to cause the clock to keep accurate time, but it will make a correction tending to improve the operation of the clock and the next time it is reset the variation of the clock hands may very well be below the critical amount.

The modification of the automatic regulator adjusting mechanism, shown in Figs. 8–15 will now be described.

So far as possible the elements of this mechanism which correspond to those shown in Figs. 1–7 have been indicated by the same reference numerals with the subscript $a$ added. Only the automatic regulator mechanism is shown in these figures and, consequently, they illustrate only the rear frame member 2a and the parts that are mounted upon it. The following description will refer almost entirely to the constructional and the operational differences between the two forms of the invention. Hence, it will be understood that the mechanism of the clock movement, including the driving spring, gear trains, hands, etc., are as illustrated in Fig. 1.

Figure 8:
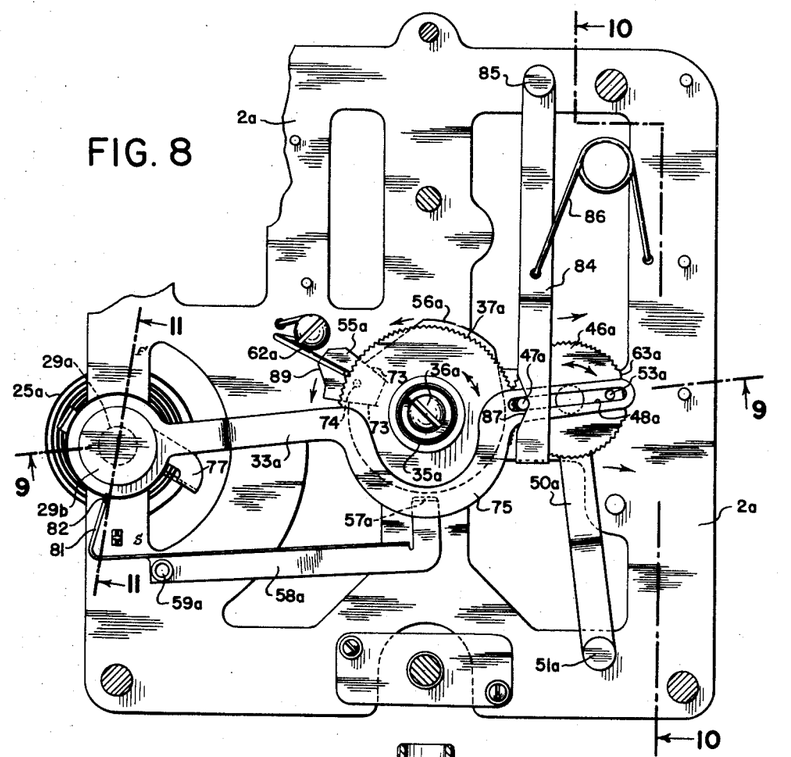
Fig. 8 is a rear elevational view of the rear frame of a clock with the automatic regulator adjusting mechanism applied to it.
Figure 9:
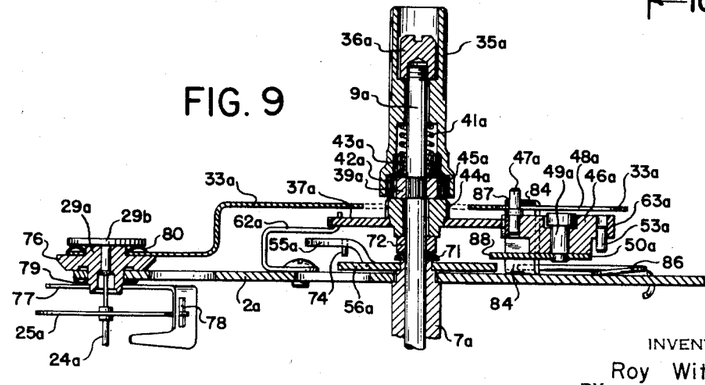
Fig. 9 is an approximately horizontal section taken on broken line 9—9 of Fig. 8.
Figures 10, 11:
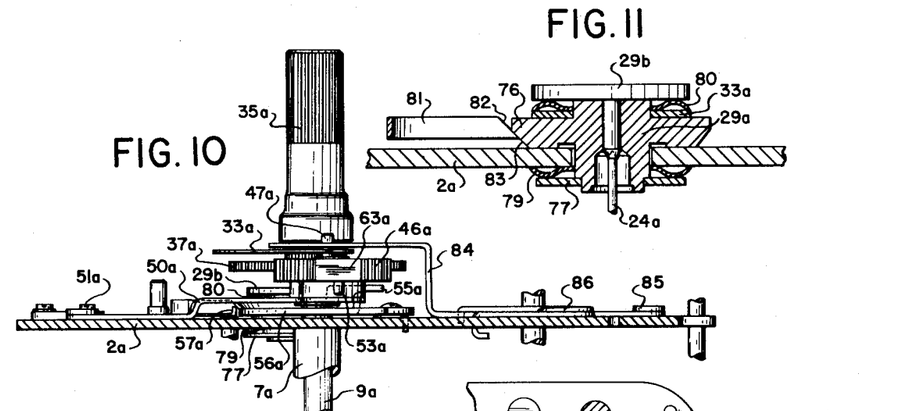
Fig. 10 is a vertical section taken on broken line 10—10 of Fig. 8.
Fig. 11 is a detail vertical section taken on line 11—11 of Fig. 8.

In the modified regulator adjusting mechanism the rear portions of the minute shaft 9a and the sleeve shaft 7a are shown in Figs. 9 and 10. So far as the driving mechanism is concerned the only difference between the two forms of the invention is the fact that in the form shown in Figs. 8–15, minute shaft 9a is driven from the rear end of sleeve shaft 7a instead of from the front end of this shaft. Hence, the slip drive connection 10, shown in Fig. 1 is omitted from the clock construction of Figs. 8–15, and, in its place, a somewhat similar slip drive connection 71 (Fig. 9) is arranged between the rear end of sleeve shaft 7a and a collar 72 which is fixed to minute shaft 9a and which serves to turn this shaft and the clock hands.

The holding or locking cam 56a is in the form of a thin metal disk which is staked, or otherwise secured, on the outer or rear end of sleeve shaft 7a. The releasing or disengaging cam 55a is integral with the disk cam 56a and is formed by cutting two approximately radial slits, shown at 73, in Fig. 8 in this disk and forming a double bend in the material between these two slits, as shown in Fig. 9, so that the cam portion 55a is displaced laterally from cam 56a and extends outwardly some distance beyond its periphery. A pin 74 is mounted in the inner portion of the cam projection 55a, as shown especially in Fig. 9, and serves in conjunction with cam 55a in accomplishing the same function as cam 55 in the form shown in Figs. 1-7, as will be explained later on.

The setting gear 37a is mounted on a hub not unlike the hub of gear 37 and turns freely on shaft 9a. Also the regulator adjusting or lever actuating gear 46a is supported for rotation on a short shaft 49a which is fixed to the upper end of bracket 50a pivoted at its lower end at 51a to frame 2a. The teeth of these two gears are of considerably smaller pitch than the teeth of the corresponding gears in Figs. 1-7, although it will be understood that the pitch of those gears 37 and 46 may be changed as desired. A detent wire 62a cooperates with the teeth of 37a, but is supported on frame 2a instead of on the rear housing, as in the previous form.

Lever actuating gear 46a and its bracket 50a are arranged on the opposite side of setting gear 37a from the clock regulator mechanism instead of being disposed between them as in Figs. 1-7. The regulator adjusting lever 33a is pivoted on the regulator mechanism, as before, but by means of a U-bend portion 75 is extended around setting handle 35a and shaft 9a (Fig. 8) so the outer end portion carrying the slot 48a is in alignment with the axis of shaft 9a and the axis of the regulator adjusting mechanism.

The regulator adjusting mechanism is of somewhat different construction than that previously described. It comprises a regulator shaft 29a (Fig. 11) having a central flange portion 76 and an inner portion which turns in an aperture in frame member 2a and on which is fixed a hair spring engaging member 77. This is a thin sheet metal stamping staked on the inner end of shaft 29a and having a downwardly turned portion which is provided with a slot 78 for engagement with the hair spring 25a. A spring washer 79 is arranged to maintain the shaft 29a and member 77 in any angular position to which they may be adjusted.

The left end of regulator actuating lever 33a has an enlarged head which contains an aperture fitting over the outer portion of regulator shaft 29a, as shown in Fig. 9. Angular movement of lever 33a is imparted to regulator shaft 29a through a friction drive washer 80 placed between the outer surface of the lever and the inner surface of a circular cap 29b which is fixed to the regulator shaft 29a. For this purpose cap 29b is provided with a stem or shank which is push-fitted into a central aperture in shaft 29a.

The locking lever 58a is pivoted at 59a and has an L-shaped end portion 57a which is engaged by the locking cam 56a during its rotation. Instead of being flexible throughout its length, like lever 58, the right hand portion of lever 58a is rigid, while the portion 81 which extends to the left of pivot 59a is resilient. The outer part of this portion 81 is bent approximately at right angles to the remainder of the lever, and extends in approximately radial direction towards the center of regulator shaft 29a. The inner end of this portion 81 is bevelled as indicated at 82 in Fig. 11 and engages a corresponding sloping surface 83 on the inner corner of the regulator shaft flange 76. When locking lever 58a is in locking position the sloping end of flexible portion 81 is wedged between the stationary frame plate 2a and the flange 76 on the regulator shaft by the action of camming surfaces 82 and 83, and holds regulator shaft 29a against rotation.

The regulator adjusting gear 46a carries a crank pin 47a which projects into slot 48a in the extension of the adjusting lever 33a which is at the right of the turning or setting handle 35a. The resetting of the crank pin 47a at its initial position after a hands correction has been made, instead of being accomplished by means of a coil spring, such as spring 52 in Figs. 1-7, is produced by a resetting lever 84 which is pivoted at 85 at its upper end to frame member 2a and which, adjacent its lower end, engages the crank pin 47a. Lever 84 is urged towards reset position, that is towards the left in Fig. 8 by means of a two-armed spring 86 one arm of which is fixed in an aperture in frame 2a, the other arm being connected with lever 84.

As the regulator adjusting gear 46a is turned during a setting operation, the crank pin 47a is rotated from the initial position shown in Fig. 8, where it is in alignment with the axis of setting handle 35a and minute shaft 9a, and the axis of regulator adjusting shaft 29a. The pressure of crank pin 47a on the edge of lever 84 forces it to the right and stresses spring 86. During this movement the crank pin slides along the surface of the lever for a total distance corresponding to the diameter of the crank pin circle.

It will be understood that the force of spring 86 operating through lever 84 is effective to return the crank pin 47a to its initial position after a hands correction which has resulted in displacing the crank pin for the purpose of activating lever 33a and producing a change in adjustment of the regulator shaft 29a. In order to enable the pin 47a to be returned accurately to its initial position in alignment with the pivots, as above-described, and as shown in Fig. 8, lever 84 is provided with a centralizing notch 87. This is a shallow notch with its two sides at an obtuse angle to one another and forming camming surfaces which facilitate the movement of crank pin 47a, particularly when it is close to the dead center position, which is the initial position (Fig. 8). These camming surfaces also serve another function which will be referred to presently.

Figure 12:
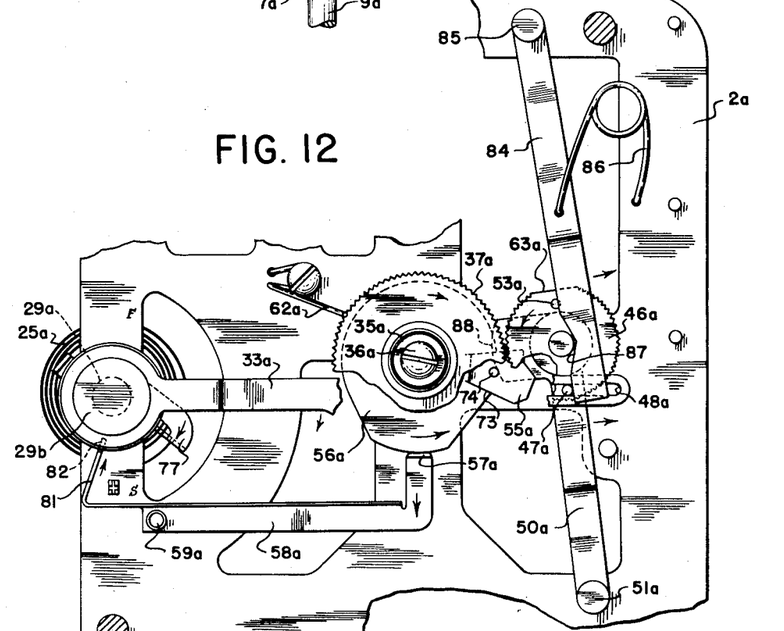
Fig. 12 is a view similar to Fig. 8 showing the regulator parts in different positions.

Referring now to Fig. 12 the positions of the parts of the regulator adjusting mechanism are shown after the hands of the clock have been reset backward by the critical amount of ten minutes by turning the resetting handle 35a. This rotates setting gear 37a which, in turn, by meshing with the teeth of lever actuating gear 46a, has turned this gear in a counterclockwise direction and swung crank pin 47a through an angle of 90° from the initial position, above described. This movement of the crank pin has swung regulator adjusting lever 33a downward and this has turned regulator shaft 29a and hair spring engaging member 77 clockwise. Hence, the regulator causes the clock to commence operating at a slower rate. As before, this is the maximum change in the regulator which the mechanism will produce.

Within an average time of thirty minutes, that is, sometime during the next complete revolution of shaft 7a and the two cams 55a and 56a, the regulator adjusting gear 46a, will be shifted to the right to disengage its teeth from those of gear 37a, and resetting lever 84 acting on crank pin 47a will return it to initial position. In Figure 12 this operation is about to take place.

The releasing or disengaging mechanism shown in the modification of Figs 8-15, for separating gears 46a and 37a is slightly different from that of Figs. 1-7. As shown in Figs. 12-15, bracket 50a which supports lever actuating gear 46a is provided with a leftward extension 88 having a curved edge. This is positioned to be engaged by the pin 74 which projects from the inner surface of releasing cam 55a (Fig. 9). In the position of the parts shown in Fig. 12, pin 74 has just engaged the curved edge of extension 88. Just previous to this the lobe of locking cam 56a has engaged the end 57a of locking lever 58a and swung this lever about its pivot so as to cause the resilient end portion 81 with its sloping surface 82 (Fig. 11) to lock the regulator shaft 29a so as to prevent rotation thereof, as previously described.

As the rotation of cams 55a and 56a continues, pin 74 will slide along the curved edge of extension 88 and move it to the right, thereby swinging bracket 50a and causing the teeth of gear 46a to be released from the teeth of 37a. In Fig. 12 this releasing action is just about to take place. As soon as this occurs, gear 46a and crank pin 47a will be returned to initial position by the action of spring actuated lever 84, as described.

Figure 13:
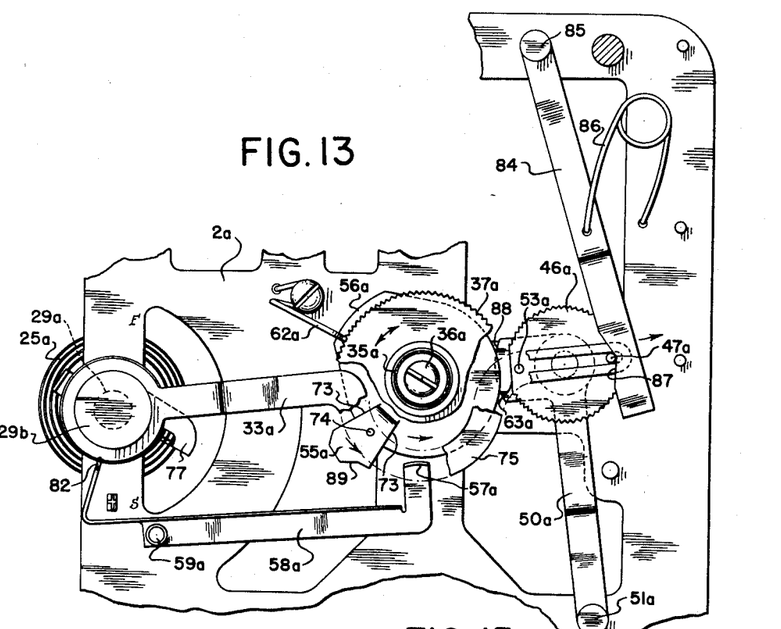
Fig. 13 is a view similar to Fig. 12 showing the parts in other positions.

The positions of the parts, shown in Fig. 13, correspond to the positions shown in Fig. 6 where the hands have been given a correction of twenty minutes or more by turning the setting handle 35a and causing the lever actuating gear 46a and crank pin 47a to be rotated 180° from the initial position of Fig. 8. At this point crank pin 47a lies on the outer dead center position, that is, in alignment with the pivots of setting handle 35a and regulator shaft 29a. In this position also the crank pin rests at the bottom of centralizing notch 87 with lever 84 swung to the right to its farthest extent. Furthermore, in this position the blank tooth section 63a, which is diametrically opposite crank pin 47a, is now adjacent setting gear 37a so that gears 46a and 37a are no longer in mesh.

Figures 14, 15:
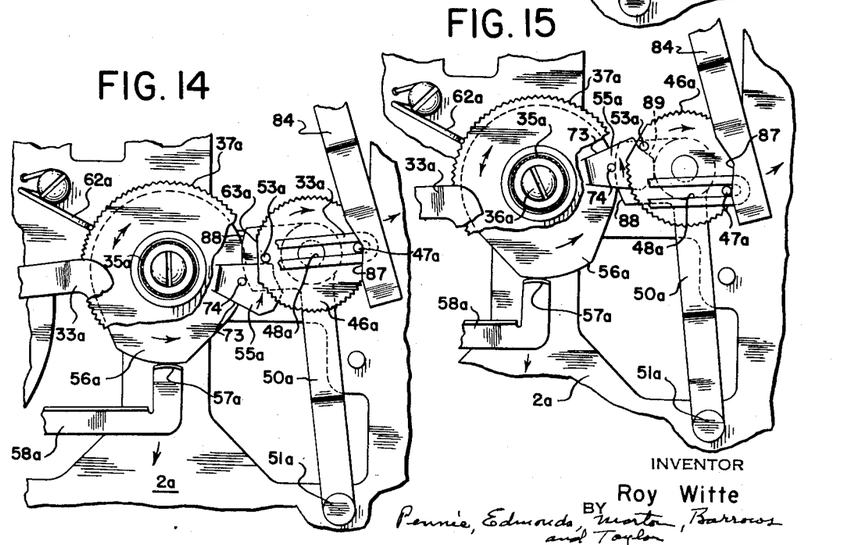
Fig. 14 is a fragmentary view similar to Fig. 12 showing the parts in still other positions.
Fig. 15 is a view similar to Fig. 14 showing the parts in slightly different positions from that figure.

As cams 55a and 56a continue their rotation, sometime during the next average period of thirty minutes, the releasing pin 74 on cam 55a will engage the curved edge of extension 88 on bracket 50a and push this bracket to the right, as before. This action, however, has no effect, under the circumstances, because gears 47a and 46a are already disengaged through the blank tooth section 63a. The position of the parts at this point is shown in Fig. 14 and this figure also shows that locking cam 56a has actuated locking lever 58a to lock the regulator shaft against rotation. Fig. 14 also shows that the side edge of cam 55a has just contacted a pin 53a which projects from the inner surface of lever actuating gear 46a. This pin corresponds to the lug 53 of Figs. 1–7 and is located diametrically opposite crank pin 47a.

In order to permit the spring actuated lever 84 to return crank pin 47a to its initial position, it must be moved away from dead center, and such movement is illustrated in Figs. 14 and 15. A partial rotation of gear 46a is produced as the edge of cam 55a causes pin 53a to slide along its surface and around its upper corner to the position shown in Fig. 15. At this point crank pin 47a has been moved just short of the end of one of the sides of centralizing notch 87. It must be moved somewhat farther to a point beyond notch 87 in order for the turning movement to the initial position to be accomplished by the pressure of lever 84. Such additional turning movement of gear 46a is produced by the outer sloping surface 89 on cam 55a which forces pin 53a to continue its rotating movement until crank pin 47a is moved beyond notch 87, whereupon the force of spring-operated lever 84 immediately turns gear 46a back to its original position, as shown in Fig. 8.

It will be understood that, as in the case of the mechanism of Figs. 1–7, should a hands correction of more than the critical amount of ten minutes and less than the final amount of twenty minutes be made, crank pin 47a will be turned to some position intermediate that shown in Figs. 12 and 13, that is, the crank pin will be turned to a position somewhere between 90° and 180° from the original or initial position of Fig. 8. During the first 90° of rotation the crank pin will turn regulator adjusting lever 33a by the maximum extent, in one direction or the other, and the continued rotation of crank pin 47a beyond the 90° position shift lever 33a back towards its normal central position. During such movement, the locking lever 58a remains unactuated so that the regulator shaft 29a is first rotated in one direction and then in the opposite direction. Should the correcting of the hands be stopped with the crank pin 47a in some position intermediate the 90° and the 180° position, a certain amount of regulation will be put in the regulator, that is, the regulator will be adjusted by an amount proportional to the angular position of lever 33a from its central position.

Should the extent of such rotation in the opposite direction be caused by the rotation of crank pin 47a to the 180° position, the regulating shaft will have been returned to its original central position. That is to say, a certain amount of regulation will first be put into the regulator, and then the same amount taken out. Should the clock require a considerable change in setting of the hands as, for example, where the clock has stopped, the continued rotation of the hands by the setting handle 35a will cause no additional change in the position of the regulator adjusting or lever actuating gear 46a and crank pin 47a because of the fact that gear 46a is out of mesh with gear 37a through the presence of blank tooth space 63a.

It will be understood that the scope of the invention is set forth in the accompanying claims.

I claim:

1. In a clock, a movement including a rate regulator, hands driven by said movement, setting mechanism for said hands, a pivotally mounted regulator adjusting lever having a slip drive connection with said regulator, said lever being rotatable in either direction from a normal central position, means operated by the setting mechanism for moving said lever from said central position in either direction during a correction of the hands, means operated by the clock movement for returning said lever to the central position, and means for holding said regulator in adjusted position during said return action.

2. A clock as set forth in claim 1 wherein the holding means comprises a knurled wheel connected to the regulator, a pivoted lever and an actuating cam for said lever operated by the clock movement in timed relation to the operation of the means for returning the regulator adjusting lever to its central position, said actuating cam moving and holding said lever in engagement with said knurled wheel during the return of said adjusting lever to central position.

3. A clock as set forth in claim 1 wherein the holding means comprises a flange on the regulator shaft having a beveled edge adjacent a fixed surface at right angles to said shaft, a pivoted lever having a wedge-shaped finger arranged to move into wedging engagement between said surface and the beveled edge of said flange, and a cam operated by the clock movement in timed relation to the operation of the means for returning the regulator adjusting lever to its central position, said cam actuating said pivoted lever to move and hold said finger in said wedging engagement with the regulator shaft flange during the return of said adjusting lever to central position.

4. In a clock, a movement including a rate regulator, hands driven by said movement, setting mechanism for said hands, a pivotally mounted regulator adjusting lever having a slip drive connection with said regulator, said lever being rotatable in either direction from a normal central position, means operated by the setting mechanism for moving said lever from said central position in either direction by an angular extent which increases with increase in the amount of the hands correction, means for temporarily locking said regulator in adjusted position, and means operative while said regulator is locked for swinging said lever relatively to said regulator through said slip drive connection to return the lever to central position.

5. In a clock, a movement including a rate regulator, hands driven by said movement, setting mechanism for said hands, a pivotally mounted regulator adjusting lever having a slip drive connection with said regulator, said lever being rotatable in either direction from a normal central position, means operated by the setting mechanism for moving said lever, said means being displaced from an initial position and moving said lever from said central position in either direction by an angular extent which increases with increase in the amount of the hands correction up to a predetermined critical correction, said means moving said lever in the opposite direction by an extent which increases with increase in the amount of hands corrections above said critical amount until said lever is again in central position, and means for returning said lever moving means to said initial position.

6. In a clock, a movement including a rate regulator, hands driven by said movement, setting mechanism for said hands, a pivotally mounted regulator adjusting lever, a slip drive connection between said lever and the regulator by which rotative movement of said lever is imparted to the regulator, a setting gear rotated by the setting mechanism, a lever actuating gear cooperating therewith, means for interconnecting said lever actuating gear and lever so as to impart pivotal movement to said lever when said lever actuating gear is turned, the pivotal movement of the adjusting lever changing the regulator adjustment, means for urging the adjusting lever and actuating gear to an initial position, means operated by the clock movement to periodically separate said gears and allow said actuating gear and said lever to return to initial position, means for locking the regulator to prevent movement thereof, and means periodically operated by the clock movement to actuate said locking means to maintain the regulator in the position to which it has been adjusted while said adjusting lever returns to initial position.

7. A clock as set forth in claim 6 wherein the means for interconnecting the regulator adjusting lever and the lever actuating gear comprises a crank pin mounted on the side of said gear and an elongated slot in said lever to coact with said crank pin.

8. A clock as set forth in claim 7 wherein the means for urging the regulator adjusting lever and its actuating gear to their initial positions comprises a spring biased resetting lever having one side thereof engaging the crank pin.

9. A clock as set forth in claim 8 wherein the resetting lever has a shallow V-shaped notch in one side edge thereof, said notch cooperating with the crank pin.

10. In a clock, a movement including a rate regulator, hands driven by said movement, setting mechanism for said hands, a pivotally mounted regulator adjusting lever, a slip drive connection between said lever and the regulator by which rotative movement of said lever is imparted to the regulator, a setting gear rotated by the setting mechanism, a lever actuating gear, means for mounting said actuating gear in rotatable and bodily shiftable position substantially on the line of the centers of the setting gear and the adjusting lever pivot, means for interconnecting said actuating gear and lever so as to impart pivotal movement to said lever when said gear is turned, the pivotal movement of the adjusting lever changing the regulator adjustment, means for urging the adjusting lever to a central position in line with said centers and said gears into meshing engagement, means operated by the clock movement to periodically shift said lever actuating gear to disengage the teeth of said gears and allow said actuating gear to return said lever to central position, means for locking the regulator to prevent movement thereof, and means operated by the clock movement to actuate said locking means to maintain the regulator in the position to which it has been adjusted while said adjusting lever returns to central position.

11. A clock as set forth in claim 8 wherein means are provided for mounting the lever actuating gear substantially on a projection of the line joining the centers of the setting gear and the adjusting lever pivot on the opposite side of said setting gear from said pivot.

12. In a clock, a movement including a rate regulator, hands driven by said movement, setting mechanism for said hands, a pivoted rate regulator adjuster, a setting gear rotated by the setting mechanism, an actuating gear meshing with said setting gear, a crank pin operatively connected to said pivoted adjuster, said crank pin being rotatable by said actuating gear from an inner dead center position to an outer dead center position, said dead center positions being with respect to a line joining the center of said adjuster pivot and the center about which said crank pin rotates, said actuating gear having a blank tooth space to disengage said gear from said setting gear when said crank pin reaches the proximity of said outer dead center position so as to prevent further actuation of said regulator adjuster when the hands are corrected beyond the amount corresponding to said outer dead center position of said crank pin.

13. In a clock, a movement including a rate regulator, hands driven by said movement, setting mechanism for said hands, a rate regulator adjuster, a setting gear rotated by the setting mechanism, an actuating gear meshing with said setting gear, a crank pin, a pivoted lever operatively connected to said crank pin and to said adjuster and whereby said crank pin actuates said adjuster, said crank pin being rotatable by said actuating gear from an inner dead center position with respect to said lever to an outer dead center position with respect thereto, said actuating gear having a blank tooth space to disengage said gear from said setting gear when said crank pin reaches the proximity of said outer dead center position so as to prevent further actuation of said regulator adjuster when the hands are corrected beyond the amount corresponding to said outer dead center position of said crank pin, and mechanism for returning said crank pin to the inner dead center position including means for biasing said crank pin towards said position, means operated by the clock movement for separating said adjusting and setting gears beyond their meshing point, and means operated by the clock movement for imparting an initial rotation to said crank pin to move it away from the outer dead center position whereby said crank pin biasing means returns it to the inner dead center position.

14. A clock as set forth in claim 13 wherein the means for biasing the crank pin towards the inner dead center position comprises a tension spring connected between said crank pin and a support substantially on the axis of said setting gear.

15. A clock as set forth in claim 13 wherein the means for biasing the crank pin towards the inner dead center position comprises a spring biased lever pivoted to operate substantially at right angles to a line through said inner and said outer dead center positions, said lever having a shallow notch in one edge thereof for engaging said crank pin.

16. In a clock, a movement including a rate regulator, hands driven by said movement, setting mechanism for said hands, a rate regulator adjuster movable in either of two directions from its original position, means operated by the setting mechanism for moving said adjuster in one direction during a predetermined correction of said hands and in the opposite direction during a greater predetermined hands correction, means operative when said predetermined correction is reached for disconnecting from said setting mechanism said means for moving the adjuster, so that no change in the adjuster is made during a further correction of said hands in the same direction regardless of the extent thereof, and means operated periodically by the clock movement for returning the adjuster to its original position.

References Cited in the file of this patent
UNITED STATES PATENTS

| | | |
|---|---|---|
| 2,542,430 | Rabinow | Feb. 20, 1951 |
| 2,554,029 | Holdman | May 22, 1951 |
| 2,785,529 | Haerri | Mar. 19, 1957 |